(12) United States Patent
Tanahashi et al.

(10) Patent No.: US 9,353,424 B2
(45) Date of Patent: May 31, 2016

(54) HIGH STRENGTH STEEL SHEET EXCELLENT IN DELAYED FRACTURE RESISTANCE AND LOW TEMPERATURE TOUGHNESS, AND HIGH STRENGTH MEMBER MANUFACTURED USING THE SAME

(71) Applicant: NIPPON STEEL & SUMITOMO METAL CORPORATION, Tokyo (JP)

(72) Inventors: Hiroyuki Tanahashi, Tokyo (JP); Toshimasa Tomokiyo, Tokyo (JP)

(73) Assignee: NIPPON STEEL & SUMITOMO METAL CORPORATION, Tokyo (JP)

(*) Notice: Subject to any disclaimer, the term of this patent is extended or adjusted under 35 U.S.C. 154(b) by 0 days.

(21) Appl. No.: 14/774,447

(22) PCT Filed: Mar. 13, 2014

(86) PCT No.: PCT/JP2014/056669
§ 371 (c)(1),
(2) Date: Sep. 10, 2015

(87) PCT Pub. No.: WO2014/142238
PCT Pub. Date: Sep. 18, 2014

(65) Prior Publication Data
US 2016/0024610 A1 Jan. 28, 2016

(30) Foreign Application Priority Data
Mar. 14, 2013 (JP) .................................. 2013-051953

(51) Int. Cl.
*C21D 9/46* (2006.01)
*C21D 6/00* (2006.01)
(Continued)

(52) U.S. Cl.
CPC ................ *C21D 9/46* (2013.01); *B32B 15/012* (2013.01); *B32B 15/20* (2013.01); *C21D 6/004* (2013.01);
(Continued)

(58) Field of Classification Search
CPC .............. C23C 2/12; C23C 2/04; C23C 2/02; C23C 2/40; C23C 2/26; C22C 38/54; C22C 38/00; C22C 38/24; C22C 38/50; C22C 38/38; C22C 38/58; C22C 38/26; C22C 38/001; C22C 38/002; C22C 38/28; C22C 38/02; C22C 38/04; C22C 38/32; C22C 38/08; C22C 38/06; C22C 38/22; C22C 38/42; C22C 38/12; C22C 38/14; C22C 38/16; C22C 38/18; C22C 38/20; C22C 38/40; C22C 38/44; C22C 38/46; C22C 38/48; B32B 15/20; B32B 15/012; B32B 15/013; B32B 15/04; B32B 15/043; Y10T 428/12757; Y10T 428/12799; Y10T 428/12958; Y10T 428/12972; Y10T 428/12979

See application file for complete search history.

(56) References Cited

U.S. PATENT DOCUMENTS

2013/0340899 A1    12/2013    Kusumi et al.
2015/0024237 A1*   1/2015     Tanahashi ................. C23C 2/06
                                                        428/653

FOREIGN PATENT DOCUMENTS

JP    2000-26934 A    1/2000
JP    2006-9116 A     1/2006
(Continued)

OTHER PUBLICATIONS

Machine Translation, Masashi et al., JP 2007-211279, Aug. 2007.*
(Continued)

*Primary Examiner* — Michael E La Villa
(74) *Attorney, Agent, or Firm* — Birch, Stewart, Kolasch & Birch, LLP

(57) ABSTRACT

A high strength steel sheet containing chemical components of, in mass %, C: 0.20 to 0.42%, Si: 0.06 to 0.5%, Mn: 0.2 to 2.2%, Cr: 0.1 to 2.5%, B: 0.0005 to 0.01%, O: 0.0020 to 0.020%, Al: 0.001 to 0.03%, Ti: 0.001 to 0.05%, N: 0.1% or less, P: 0.03% or less, S: 0.02% or less, and the balance: Fe and inevitable impurities. In steel, $5 \times 10^3$ pieces per $mm^2$ or more to $1 \times 10^5$ pieces per $mm^2$ or less of Mn oxides having a maximum length of 1 μm or more to 5 μm or less are present, and $1.7 \times 10^2$ pieces per $mm^2$ or more to $5 \times 10^3$ pieces per $mm^2$ or less of Mn—Si composite oxides having a short-axial length of 1 μm or more and a longitudinal length of 10 μm or less are present.

9 Claims, 3 Drawing Sheets

(51) Int. Cl.
| | |
|---|---|
| *C22C 38/54* | (2006.01) |
| *C22C 38/50* | (2006.01) |
| *C22C 38/42* | (2006.01) |
| *C22C 38/32* | (2006.01) |
| *C22C 38/28* | (2006.01) |
| *C22C 38/26* | (2006.01) |
| *C22C 38/24* | (2006.01) |
| *C22C 38/22* | (2006.01) |
| *C22C 38/06* | (2006.01) |
| *C22C 38/04* | (2006.01) |
| *C22C 38/02* | (2006.01) |
| *C22C 38/00* | (2006.01) |
| *B32B 15/20* | (2006.01) |
| *B32B 15/01* | (2006.01) |
| *C23C 2/12* | (2006.01) |
| *C23C 2/40* | (2006.01) |
| *C22C 38/38* | (2006.01) |
| *C22C 38/58* | (2006.01) |
| *C21D 7/13* | (2006.01) |
| *C21D 6/02* | (2006.01) |
| *C21D 1/18* | (2006.01) |

(52) U.S. Cl.
CPC .............. *C21D 6/005* (2013.01); *C21D 6/008* (2013.01); *C21D 6/02* (2013.01); *C21D 7/13* (2013.01); *C22C 38/00* (2013.01); *C22C 38/001* (2013.01); *C22C 38/002* (2013.01); *C22C 38/02* (2013.01); *C22C 38/04* (2013.01); *C22C 38/06* (2013.01); *C22C 38/22* (2013.01); *C22C 38/24* (2013.01); *C22C 38/26* (2013.01); *C22C 38/28* (2013.01); *C22C 38/32* (2013.01); *C22C 38/38* (2013.01); *C22C 38/42* (2013.01); *C22C 38/50* (2013.01); *C22C 38/54* (2013.01); *C22C 38/58* (2013.01); *C23C 2/12* (2013.01); *C23C 2/40* (2013.01); *C21D 1/18* (2013.01); *C21D 2211/001* (2013.01); *C21D 2211/004* (2013.01); *Y10T 428/12757* (2015.01); *Y10T 428/12799* (2015.01); *Y10T 428/12958* (2015.01); *Y10T 428/12972* (2015.01); *Y10T 428/12979* (2015.01)

(56) References Cited

FOREIGN PATENT DOCUMENTS

| | | |
|---|---|---|
| JP | 2006-83419 A | 3/2006 |
| JP | 2007-211279 A | 8/2007 |
| JP | 2010-174291 A | 8/2010 |
| WO | WO 2012/120692 A1 | 9/2012 |
| WO | WO 2013/133270 * | 9/2013 |

OTHER PUBLICATIONS

International Search Report issued in PCT/JP2014/056669, mailed on Jun. 3, 2014.

Written Opinion of the International Search Authority issued in PCT/JP2014/056669, mailed on Jun. 3, 2014.

* cited by examiner

| (a) | (b) |
|---|---|
| No. 2 | No. 3 |
| 0.020%Si | 0.060%Si |

HIGH STRENGTH STEEL SHEET EXCELLENT IN DELAYED FRACTURE RESISTANCE AND LOW TEMPERATURE TOUGHNESS, AND HIGH STRENGTH MEMBER MANUFACTURED USING THE SAME

TECHNICAL FIELD

The present invention relates to high-strength steel sheets suitable for hot stamping, for example, and more particularly relates to a high-strength steel sheet excellent in delayed fracture resistance and low-temperature toughness. This application claims the benefit of priority from Japanese Patent Application No. 2013-051953, filed on Mar. 14, 2013, the content of which is incorporated herein by reference.

BACKGROUND ART

Vigorous attempts are made in general to reduce the mass of a vehicle, including an automobile, by using high strength materials in the transportation equipment industry. In the automobile industry, however, the mass of a vehicle has tended to increase recently by adding more crash-safety capabilities and other new functions. The use of the high strength steel sheets has steadily increased in an effort to offset even a part of the increase in the automobile body mass as well as to improve efficiency in fuel consumption and to reduce carbon dioxide emission.

In the tendency of the increasing use of the high-strength steel sheets, what comes to the surface as a large obstacle is a phenomenon called "deterioration in shape fixability" that inevitably occurs when the strength of the steel sheet is increased. This phenomenon generally refers to the fact that it becomes difficult to obtain a desired shape due to springback after shaping. The amount of the springback increases as the steel sheet becomes stronger. To solve this problem, efforts have been made to change product shapes or to add a manufacturing process (for example, a restriking process) that has not been necessary in the case of low-strength materials (that are excellent or non-problematic in terms of the shape fixability).

As another solution to this problem, a hot shaping method called hot stamping has come to people's attention. With the hot stamping, a steel sheet (a material to be shaped) is heated to a predetermined temperature (generally for an austenite phase) and the strength is made lower (i.e., easier for shaping). The steel sheet is then shaped with dies of a lower temperature (for example, at room temperature) than that of the material to be shaped. In this way, the material is shaped easily and cooled rapidly (quenching) using this temperature difference, so that the product strength after shaping is secured.

The hot stamping has been widely recognized to be useful in recent years and the possibilities of application to a wide range of steel members have been studied. Among such steel members, some are exposed to a harsh environment in terms of corrosion resistance, such as underbody parts of an automobile, or some have pierced portions for allowing optional parts to be attached. For such steel members, delayed fracture resistance as well as product strength as parts has been regarded as one of the important required properties.

The delayed fracture becomes a concern in a condition that hydrogen penetration is expected to be larger due to exposure to a corrosive environment and/or residual stress remaining in a pierced portion becomes significant to a degree that is not negligible.

Generally, the delayed fracture resistance of a steel sheet is known to be deteriorated as the strength of the steel sheet increases. Considerations have already been made in advance to some of the steel sheets (products) having a strength increased by hot stamping.

For example, Patent Literature 1 discloses a technique related to the steel sheet having properties to restrain delayed fractures. For this purpose, one or more of oxides, sulfides, and composite crystals and composite precipitates of Mg, each having an average grain size within a predetermined range, are added at a predetermined density in the steel sheet.

Patent Literature 2 discloses a technique for improving delayed fracture resistance by carrying out punching perforation (piercing) at a high temperature (hot working) after heating for hot stamping and before pressing, and thus improving punching quality.

Patent Literature 3 discloses a technique for obtaining a steel sheet with an excellent delayed fracture resistance by including Fe—Mn composite oxides having predetermined dimensions at a predetermined density in the steel sheet.

The technique disclosed in Patent Literature 1, however, is not very easy even for those skilled in the art to carry out. Mg, which is not easy to be included in the steel, is required to exist in the steel and the product containing Mg needs to be highly controlled.

The technique disclosed in Patent Literature 2 presupposes that the piercing work is performed during hot working. The effect is not clear, however, in the case that the piercing work is carried out after hot stamping, that is, the residual stress may remain to a degree that is not negligible.

On the other hand, the technique disclosed in Patent Literature 3 is excellent since effective hydrogen trapping sites are formed in the steel by combining deoxidation control during the steel making process with appropriate rolling conditions, and thus a certain positive effect may be expected.

The present inventors carried out experiments repeatedly to investigate the mechanical properties, after hot pressing, of the steel sheets prepared with reference to Patent Literature 3. The experiment results showed a certain positive effect in the delayed fracture resistance. However, there were found problems that low-temperature toughness was not sufficient and casting defects occurred frequently especially in high C (carbon) concentration cases in which the cast material was not able to be rolled or, if rollable, the product yield rate dropped considerably.

As described above, the facts are that there is not found a technique that can easily provide steel members, at a satisfactory yield rate, that are processed after hot stamping in a way that the residual stress remains, such as in piercing work, and that have the delayed fracture resistance and the low-temperature toughness at the same time.

PRIOR ART LITERATURE(S)

Patent Literatures

[Patent Literature 1] JP 2006-9116A
[Patent Literature 2] JP 2010-174291A
[Patent Literature 3] WO 2012/120692

SUMMARY OF INVENTION

Problems to be Solved by the Invention

In view of the foregoing, an object of the present invention is to provide a steel sheet for hot stamping that can be easily manufactured with an existing steel making facility at a high yield rate and that has an excellent delayed fracture resistance and low-temperature toughness even if the steel member is processed in the way that the residual stress is expected to remain, as is in the piercing work, after being shaped in a hot stamping facility.

Means for Solving the Problems

The present inventors have eagerly studied steel sheets for hot stamping in order to solve the aforementioned problem. The present inventors adopted a base technique that allows Mn oxide, which can be easily generated in the steel, to be included in the steel sheets, and further studied problems that could not be solved with the base technique alone.

In particular, the following two problems are to be solved:

(A) The steel sheet having a tensile strength of 1500 MPa or more obtained after hot stamping needs to contain carbon at 0.2% or more (in mass %, hereinafter % is expressed by mass). In the carbon steel having a high concentration of carbon, however, the carbon itself has a deoxidation capability, and the deoxidation reactions generate CO, which forms bubbles in molten steel. The bubbles remain in casting products and tend to cause casting defects.

(B) The other problem that needs to be seriously taken into account is that although it is effective to disperse oxides in the steel sheet as hydrogen trapping sites, the dispersion of the oxides may deteriorate low-temperature toughness depending on the forms and densities of the oxides.

In order to address (A), the present inventors have studied a method to restrain bonding of carbon with oxygen by adding a small amount of Si and found that the suitable concentration of Si exists within a range that was described not suitable in Patent Literature 3. The present inventors have also found that the forms of inclusions (oxides) can be transformed by adding Si at a predetermined concentration, which is also effective to address (B).

Now, the present invention, which has been completed through the aforementioned studies, will be summarized as below.

(1)

A high strength steel sheet containing chemical components of, in mass %,
C: 0.20 to 0.42%,
Si: 0.06 to 0.5%,
Mn: 0.2 to 2.2%,
Cr: 0.1 to 2.5%,
B: 0.0005 to 0.01%,
O: 0.0020 to 0.020%,
Al: 0.001 to 0.03%,
Ti: 0.001 to 0.05%,
Nb: 0 to 0.1%,
Mo: 0 to 1.0%,
W: 0 to 0.5%,
V: 0 to 0.5%,
Ni: 0 to 5.0%,
Cu: 0 to 1.0%,
N: 0.1% or less,
P: 0.03% or less,
S: 0.02% or less, and
the balance: Fe and inevitable impurities.

In steel, $5 \times 10^3$ pieces per $mm^2$ or more to $1 \times 10^5$ pieces per $mm^2$ or less of Mn oxides having a maximum length of 1 µm or more to 5 µm or less are present, and $1.7 \times 10^2$ pieces per $mm^2$ or more to $5 \times 10^3$ pieces per $mm^2$ or less of Mn—Si composite oxides having a short-axial length of 1 µm or more and a longitudinal length of 10 µm or less are present.

(2) The high strength steel sheet according to (1), further containing one or more selected from the group consisting of, in mass %,
Nb: 0.01 to 0.1%,
Mo: 0.01 to 1.0%,
W: 0.01 to 0.5%,
V: 0.01 to 0.5%,
Ni: 0.01 to 5.0%, and
Cu: 0.01 to 1.0%.

(3)

The high strength steel sheet according to (1) or (2), in which the steel sheet is cold rolled by 35 to 70%.

(4)

The high strength steel sheet according to (3), in which the steel sheet is plated.

(5)

The high strength steel sheet according to (4), in which the steel sheet has an hot-dip-plated Al layer on the surface thereof, and an Fe—Al—Mn—Cr—B alloy layer having a thickness of 1 µm or more and 10 µm or less is present at an interface between the Al layer and the steel sheet.

(6)

A high strength member, in which the high strength steel sheet according to (3) is heated to a temperature at which at least a portion of the steel sheet is transformed into an austenite phase, and is subsequently stamped with dies such that shaping and quenching are carried out in one process.

(7)

A high strength member, in which the high strength steel sheet according to (4) or (5) is heated to a temperature at which at least a portion of the steel sheet is transformed into an austenite phase, and is subsequently stamped with dies such that shaping and quenching are carried out in one process.

Effects of the Invention

A steel sheet of the present invention can be manufactured with an existing steel making facility. Even if the steel sheet, which is shaped in a hot stamping facility, undergoes processing, such as a piercing work, in which residual stress is expected to remain, the steel sheet still has an excellent delayed fracture resistance and low-temperature toughness. Consequently, the steel sheet of the present invention has an effect to expand the application range (the range of parts to be applied) of hot stamping.

BRIEF DESCRIPTION OF THE DRAWING(S)

FIG. 1 schematically illustrates the maximum length of oxides in a steel sheet, in which (a) is a rectangular-shaped oxide and (b) is a polygonal oxide.

FIG. 2 schematically illustrates lengths in the short axis direction and in the longitudinal direction of a drawn oxide.

Figure 5:
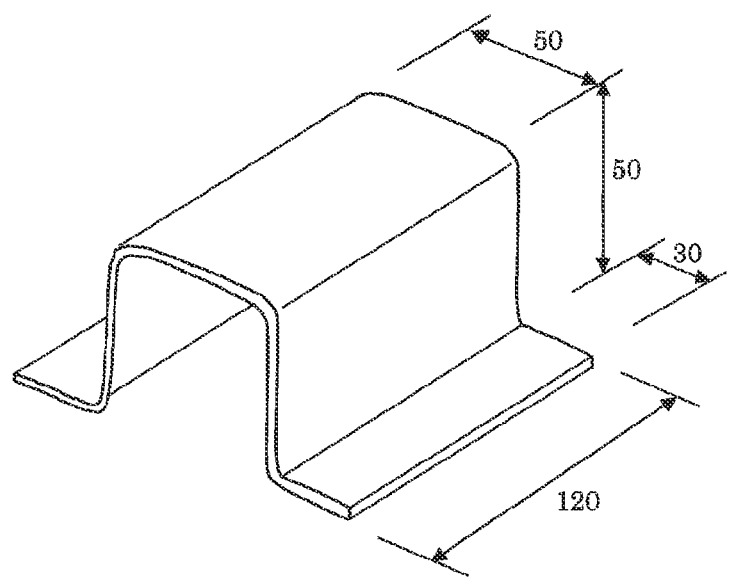

FIG. 5 schematically illustrates a hat shape in which the figures are approximate dimensions expressed in mm.

MODE(S) FOR CARRYING OUT THE INVENTION

Now, the present invention will be described in detail.

Reasons for imposing limitations on the chemical components of a steel sheet of the present invention will be described first, where "%" expresses mass %.

<C: 0.20 to 0.42%>

C is the most important element in increasing the strength of a steel sheet by hot stamping. C needs to be contained in the steel sheet at 0.20% or more in order to obtain a strength of at least about 1500 MPa. If the C concentration exceeds 0.42%, on the other hand, the steel sheet cannot secure low-temperature toughness even if the oxide control according to the present invention is employed. Accordingly, the maximum concentration of C is set to 0.42%. For a more excellent low-temperature toughness, 0.36% or less is preferable.

<Si: 0.06 to 0.5%>

Si contributes to restraining the generation of CO bubbles, from C deoxidation, which cause casting defects. The present inventors performed experiments of melting and casting the steel that contains, as major compositions, C: 0.20 to 0.42%, Mn: 1 to 1.5%, Cr: 0.2%, B: 0.0020% and the balance: Fe, in order to obtain the steel in which Mn oxides were dispersed. Results showed that bubble-like defects were sometimes generated on the surface of casting products. The results also showed that the bubble-like defects were sporadically generated from a C concentration of around 0.25% and frequently generated from 0.3% or above. There existed deep defects as well in some casting products that, the inventors had to determine, were not appropriate for rolling even if the surface is treated.

To solve this problem, the inventors attempted to add a small amount of Si (for Si deoxidation). Si is an element that has a better deoxidation capability than Mn and a less aggregation tendency of resulted oxides than Al. As a result, the inventors found that a Si content of 0.06% or more completely suppressed blowhole defect generation. Accordingly, the minimum concentration of Si is set to 0.06%. For the purpose of blowhole defect suppression, there is no limit in terms of the upper boundary. Too much oxide generation, however, causes deterioration in the low-temperature toughness. Accordingly, a permissible upper limit is 0.5%, preferably 0.3% or less, and more preferably 0.2% or less.

The amount of Si is a total sum of Si that forms oxides (including Si—Mn composite oxides) and Si that is solved in the steel without bonding with oxygen. Si acts as the deoxidation element to restrain the generation of CO bubbles as described above. Moreover, the inventors have found that Si forms composite oxides with Mn and the oxides contribute effectively to improving the low-temperature toughness, which should be also included in the gist of the present invention.

<Mn: 0.2 to 2.2%>

Mn is the most important element for the present invention. Mn oxides are quite important not only in functioning as hydrogen trapping sites but in serving to form composite oxides with Si. The composite oxides with Si are extremely important in securing the low-temperature toughness. This effect appears when the Mn concentration is 0.2% or more. However, this effect becomes saturated and a risk of deteriorating mechanical properties becomes larger due to solidifying segregation when the Mn concentration goes beyond 2.2%. Therefore, the upper limit of the Mn concentration is set to 2.2%, preferably 2.0%, and more preferably 1.8%.

<Cr: 0.1 to 2.5%>

Cr has an effect to improve hardenability and thus is contained in the steel sheet. The effect becomes apparent at 0.1% or more. The effect, however, becomes saturated at a concentration exceeding 2.5% and thus the upper limit is set to 2.5%, preferably 2.0%, and more preferably 1.8%.

<B: 0.0005 to 0.01%>

As in Cr, B has an effect to improve hardenability and thus is contained in the steel sheet. The effect becomes apparent at 0.0005% or more. An excess concentration deteriorates workability in hot working and ductility, and thus the upper limit is set to 0.01%. To further improve hardenability and restrain deterioration in the workability in hot working and deterioration in the ductility, the B concentration is preferably from 0.0010 to 0.007%.

<O: 0.0020 to 0.020%>

O is an indispensable element to form oxides. Oxides are extremely important in forming hydrogen trapping sites and in affecting the low-temperature toughness, and thus must be controlled properly. When the concentration is less than 0.0020%, the density of the oxides is not enough. If more than 0.02%, the coarsening of the oxides may lead to deterioration in mechanical properties. Therefore, oxygen limits are set to the range described above.

<Al: 0.001 to 0.03%>

Al is a strong deoxidation element and must be controlled carefully. Containing Al at a concentration exceeding 0.03% makes it difficult to secure predetermined amounts of Mn oxide that is effective for delayed fracture resistance and Mn—Si composite oxide that is important to secure low-temperature toughness. Accordingly, the upper limit is set to 0.03% and preferably 0.01%. The lower limit is set to 0.001% because any concentration less than 0.001% will impose too much burden on the steel making process.

<Ti: 0.001 to 0.05%>

Ti is an element that has a capability of deoxidation and has an impact on the forming of Mn oxides and Mn—Si composite oxides. Ti must be controlled to a concentration of 0.05% or less and preferably 0.03% or less. The lower limit is set to 0.001% because any concentration less than 0.001% will impose too much burden on the steel making process.

Now, components to be selectively added will be explained as below.

<Nb: 0 to 0.1%>

Nb may be appropriately contained because adding Nb has an effect to miniaturize crystal grains and improve toughness. The effect appears at 0.01% or more. It is desirable to set the lower limit to 0.01% to obtain such effect. The upper limit is set to 0.1% because the effect is saturated at a concentration exceeding 0.1%.

One or more of <Mo: 0 to 1.0%>, <W: 0 to 0.5%>, and <V: 0 to 0.5%>

Each of these elements has an effect to improve hardenability and may be contained appropriately. The effect becomes apparent for each element at 0.01% or more. Each one is a high-priced element and thus the upper limit is preferably set to a concentration at which the effect becomes saturated, i.e., 1.0% for Mo, and 0.5% for W and V.

<Ni: 0 to 5.0%>

Ni is an element that has an effect to improve hardenability and is to be utilized effectively. The effect becomes apparent at 0.01% or more. Ni is a high-priced element and the upper limit is set to a concentration at which the effect becomes saturated, i.e., 5.0%. It is desirable to include Ni together with Cu because Ni has an effect to restrain degradation of the surface quality of a hot-rolled steel sheet caused by adding Cu as described below.

<Cu: 0 to 1.0%>

Cu has an effect to increase the strength of the steel sheet by an addition of 0.01% or more. Too much addition, however, leads to degradation of the surface quality of a hot-rolled steel sheet. The upper limit is set to 1.0% accordingly.

The remaining component in the present invention other than aforementioned elements is Fe. Inevitable impurities derived from melted materials such as scraps and from refractory materials are allowed to be included. Typical impurities are listed below.

<N: 0.1% or Less>

N is bonded to Ti and B easily and needs to be controlled to a level of a concentration that will not reduce the effects expected for Ti and B. The permissible level of the concentration is 0.1% or less and preferably 0.01% or less. It is desirable to set the lower limit to 0.0010% because any concentration less than a necessary level will impose too much burden on the steel making process.

<P: 0.03% or Less>

P, which is contained as an impurity, has a negative impact on workability in hot working and thus must be limited to 0.03% or less. It is preferable to limit P as low as possible. It is desirable, however, to set the lower limit to 0.001% because any concentration less than a necessary level will impose too much burden on the steel making process.

<S: 0.02% or Less>

S, which is contained as an impurity, has a negative impact on mechanical properties including workability in hot working, ductility, and toughness, and thus must be limited to 0.02% or less. It is preferable to limit S as low as possible. It is desirable, however, to set the lower limit to 0.0001% because any concentration less than a necessary level will impose too much burden on the steel making process.

Described now will be reasons to impose limitations on Mn oxide and Mn—Si composite oxide.

Regarding Mn oxide, the oxide itself and a void formed around the oxide during cold rolling become a hydrogen trapping site in the steel sheet, whereby an excellent delayed fracture resistance is developed. Consequently, the Mn oxide needs to be dispersed at a predetermined density. As will be shown in Examples, the effect does not appear clearly if the oxides are less than $5 \times 10^3$ pieces per mm² On the other hand, from a view point of the delayed fracture resistance, the upper limit is not necessarily set on the density. The upper limit of the density, however, is set to $1 \times 10^5$ pieces per mm² in order to avoid a negative impact on mechanical properties including ductility and toughness.

Figure 1:
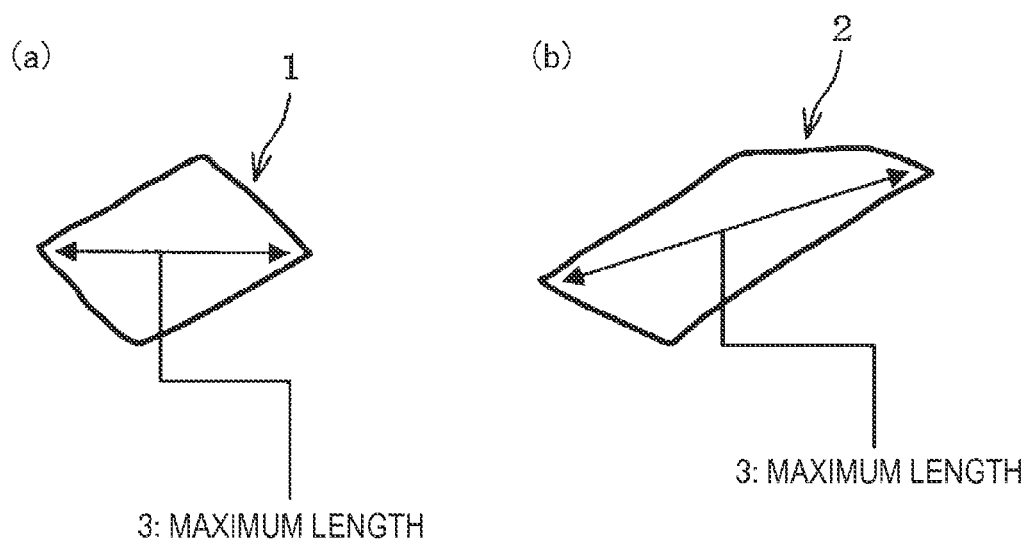

To identify a Mn oxide, energy dispersive X-ray spectroscopy (EDS) analysis using a scanning electron microscope (SEM) was employed. An object from which Mn and O (oxygen) were detected at the same time was regarded as a Mn oxide. If the maximum length of an object to be analyzed is less than 1 μm, sufficient analytical accuracy is not secured. Accordingly, the lower limit of the maximum length of the Mn oxide was set to 1 μm or larger. From a view point of the delayed fracture resistance, the upper limit is not necessarily set on the size of the oxide. The upper limit of the size, however, is set to 5 μm or less in order to avoid a negative impact on mechanical properties including ductility and toughness. With reference to FIG. 1 that schematically illustrates shapes of oxides, a maximum length 3 of the oxide as used herein is designated by the longest diagonal of a rectangular-shaped oxide 1 or a polygon oxide 2.

Figure 2:
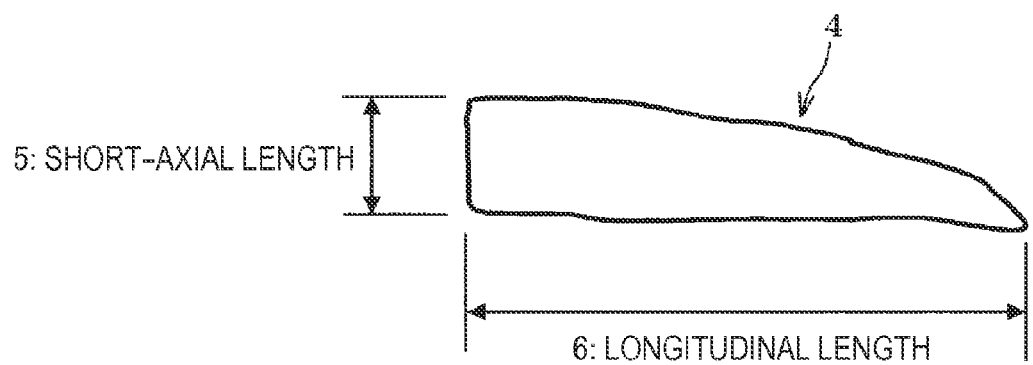

According to the present inventors' study, Mn oxide is shaped as either a rectangle or a polygon and maintains the shape after cold rolling. In contrast, Mn—Si composite oxide has a drawing capability with cold rolling. The dispersion of moderately drawn Mn—Si composite oxides in the steel is likely to contribute to securing the low-temperature toughness. As used herein, the term a drawn Mn—Si composite oxide refers to the one having a longitudinal length that is approximately 3 times or more longer than the short-axial length. Inclusions dispersed in the steel sheet were investigated by the EDS analysis using SEM. The inclusions from which Mn, Si, and O (oxygen) were detected at the same time were regarded as Mn—Si composite oxides. For reliable analysis, the dimension of an object needs to have a short-axial length of 1 μm or more. For this reason, the lower limit of the size of a Mn—Si composite oxide was set to a short-axial length of 1 μm. From a view point of securing analytical reliability, the upper limit is not necessarily set on the short-axial length. The upper limit of the short-axial length, however, is set to 3 μm, preferably 2 μm, to avoid the deterioration in mechanical properties (such as elongation and toughness). For the purpose of securing toughness, the upper limit is not necessarily set on the longitudinal length. The upper limit of the longitudinal length, however, is set to 10 μm, preferably 5 μm, to avoid deterioration in ductility that occurs if the size is too large (too long). As schematically illustrated in FIG. 2, a short-axial length 5 and a longitudinal length 6 as used herein respectively refer to the length in the short axis direction (short-axial length) 5 and the length in the longitudinal direction (longitudinal length) 6 of a drawn Mn—Si composite oxide 4.

As will be shown in Examples, $1.7 \times 10^2$ pieces per mm² of Mn—Si composite oxides or more need to be contained. A density less than this number does not secure an excellent low-temperature toughness. On the other hand, if more than $5 \times 10^3$ pieces per mm² of Mn—Si composite oxides exist, the ductility in the direction perpendicular to a rolling direction deteriorates considerably, and thus the upper limit is set to $5 \times 10^3$ pieces per mm².

A procedure to obtain the density of oxides is as follows: the number of the target oxides within the fields of view was counted (totaled) using SEM with 3000 magnifications and 10 fields of view. One field is dimensioned about 40 μm by 30 μm. The number of oxides in an area of $1.2 \times 10^4$ μm² (i.e., 40×30×10) was converted into a density per square millimeter (mm²).

A method for producing a steel sheet of the present invention will now be described.

A steel sheet of the present invention is produced by carrying out steelmaking, casting, hot rolling, cold rolling, and annealing based on conventional procedures. Plating may be carried out as well. Steel can be prepared and casted in line with the current conditions of a manufacturer in terms of materials to be used (concentration of impurities), yield rate of each element and so forth. For example, steel is made from materials excluding Si by a normal procedure, and Si is added to the steel, and then the steel is casted after a predetermined period of time.

As will be explained in Examples, the density of Mn oxides decreases as the elapsed time between Si addition and steel casting becomes longer. In contrast, the density of Mn—Si composite oxides increases as the elapsed time between the Si addition and the steel casting becomes longer. An appropriate range of the elapsed time between the Si addition and the steel casting was 35 to 145 seconds with a small-scale melting furnace that the present inventors employed. The time, however, can be set in line with the current conditions of a facility to be used. From a productivity point of view, continuous casting is desirable.

For hot rolling, for example, the following parameters may be used: a temperature of 1200 to 1250° C. for heating a casting product, a reduction ratio of 50 to 90% for rough rolling, a reduction ratio of 60 to 95% for finish rolling, and a finishing temperature of about 900° C.

A cold-rolling reduction ratio in cold rolling is very important, which must be 35% to 70%. Rolling with a reduction ratio of 35% or more is required to create a void around a Mn oxide and to draw and deform a Mn—Si composite oxide appropriately. However, if the reduction ratio is too high, the once-generated void around the Mn oxide is crushed and disappears. Moreover, the drawn and deformed Mn—Si composite oxide is split and ceases to contribute to the toughness. The upper limit therefore needs to be set to 70%.

It is desirable to set a temperature for annealing a cold-rolled steel sheet to 700 to 850° C. The temperature, however, may be set to less than 700° C. or to more than 850° C. in order to distinguish a product by having a unique mechanical property. From a productivity point of view, continuous annealing is desirable.

The steel sheet may be a steel sheet plated with Al, Zn, or the like after annealing. From a productivity point of view, it is desirable to carry out annealing and plating as one continuous operation. A Zn-plated steel sheet may be heated to transform the plating layer into Fe—Zn alloy. In the case of an Al-plated steel sheet, a Fe—Al—Mn—Cr—B alloy layer is formed at the interface between the Al plating layer and the steel sheet base. For the Al-plated steel sheet, the transfer of hydrogen from the Al plating layer to the steel sheet base is restrained because the Fe—Al—Mn—Cr—B alloy layer is formed at the interface between the Al plating layer and the steel sheet base. Incidentally, almost no Si is contained in this alloy layer of the steel sheet according to the present invention. This is because most of the added Si is consumed to reduce Mn oxides to Mn—Si composite oxides under such oxygen concentration state that Mn oxides and Mn—Si composite oxides are generated as in the present invention, and thus almost no Si is contained in the Fe—Al—Mn—Cr—B alloy layer at the interface between the Al plating layer and the steel sheet base.

The annealed and plated steel sheet (hoop) may go through skin pass rolling and roll leveller treatment. The resulted strain is preferably controlled to 10% or less.

The produced steel sheet according to the present invention is made into a high strength member by hot stamping in which shaping and quenching are carried out as one process, for example. In the production of the high strength member, a steel sheet (blank), which has been cut to predetermined dimensions according to requirements, is heated and then stamped with dies. For heating, a method such as furnace heating, electric heating, induction heating and so forth may be employed. The temperature to which the whole blank is heated is generally set to a level for an austenite phase. Only a portion of the blank may be heated to the level for the austenite phase in order to add a unique property to the member. Cooling by the dies is generally carried out at a cooling rate that allows the portion that has been heated to the level for the austenite phase to be transformed into a martensite phase. In order to add a unique property to the member, however, the cooling rate may be set slower so that the portion that has been heated to the level for the austenite phase is not transformed into the martensite phase.

Delayed fracture resistance of the steel sheet was evaluated by conducting piercing tests with different clearances and by observing presence or absence of crack generation on a wall portion of each pierced hole.

More particularly, a hole of 10 mmφ was pierced through a steel sheet of t (mm) in thickness. The diameter of a punch Dp was constantly set to 10 mm. The inner diameter of a die Di was varied in a clearance range of 5 to 30% where the clearance was calculated from (Di−Dp)/2t×100. Subsequently, the presence or absence of cracks in the hole wall portion was observed. The steel sheet in which no crack generation was observed was determined excellent in the delayed fracture resistance. The number of pierced holes for each clearance type was 5 or more and all the hole walls were observed.

Toughness was evaluated using the Charpy impact test in accordance with JIS Z 2242. A test piece was prepared in accordance with No. 4 test piece specified in JIS Z 2202. The thickness of the test piece was the same as that of a sample as it was.

The tests were conducted in a range from −120° C. to 20° C. and a ductile-brittle transition temperature was determined based on changes in absorbed energy.

EXAMPLE(S)

Example 1

Experiments of melting and casting raw materials using a small-scale melting furnace were conducted. The chemical components were adjusted so as to contain C: 0.36%, Mn: 1.3%, P: 0.02%, S: 0.004%, Cr: 0.2%, B: 0.0025%, Ti: 0.01%, Al: 0.002%, N: 0.003%, O: 0.0150%, and the balance: Fe and inevitable impurities.

A predetermined amount of Si was subsequently added to the melted materials, which were casted into a mold having inner dimensions (in millimeter) of 110×220×400 (maximum height) 90 seconds after Si addition. The amount of added Si ranged from 0 (no addition) to 0.3%. The concentration was calculated with the assumption that all of the added Si remained in the casting product. Solidified surfaces (two faces) of the casting product having dimensions of 220 by 400 were ground smooth by 5 mm and the generation of defects derived from bubbles was investigated. The casting product was subsequently hot rolled from 110 mm to 30 mm. The hot-rolled material was analyzed to determine the concentration of major components. The results are summarized in Table 1.

TABLE 1

Figure 3:
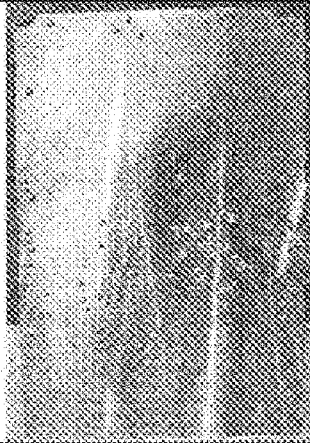
FIG. 3 shows photographs for exemplifying variations of blowhole defects depending on different Si contents.

| No. | Amount of added Si (%) | Major components (%) | | | | Defects | Remarks |
| --- | --- | --- | --- | --- | --- | --- | --- |
| | | C | Si | Mn | O | | |
| 1 | Not added | 0.35 | less than 0.001 | 1.22 | 0.0091 | Observed | Comparative example |
| 2 | 0.02 | 0.35 | 0.020 | 1.28 | 0.0048 | Observed (see FIG. 3(a)) | Comparative example |
| 3 | 0.07 | 0.36 | 0.060 | 1.29 | 0.0042 | Not observed (see FIG. 3(b)) | Present invention |

TABLE 1-continued

| | Amount of added Si | Major components (%) | | | | Defects | Remarks |
|---|---|---|---|---|---|---|---|
| No. | (%) | C | Si | Mn | O | | |
| 4 | 0.1 | 0.35 | 0.101 | 1.27 | 0.0039 | Not observed | Present invention |
| 5 | 0.3 | 0.35 | 0.287 | 1.25 | 0.0034 | Not observed | Present invention |

A large number of blowhole defects were observed in No. 1 to which Si had not been added (the concentration was less than 0.001%) and in No. 2 to which 0.02% Si had been added (the concentration was 0.020%). In contrast, no blowhole defect was observed in Nos. 3, 4, and 5 in each of which a Si content was 0.06% or more. The surface conditions of No. 2 and No. 3 are shown for contrast in FIG. 3(a) and FIG. 3(b), respectively.

No. 1 and No. 2 started to develop cracking during rolling, which made it difficult to roll to less than 30 mm. In contrast, no problem was found in the rollability of No. 3 to No. 5, which were subsequently rolled down to 2 mm without problem (this rolling corresponds to finishing rolling). It became apparent that casting defects were able to be suppressed completely in the same way for other C concentration cases than this Example if Si is added to 0.06% or more.

Example 2

Raw materials were melted using a small-scale melting furnace and the chemical components were adjusted so as to contain: C: 0.3%, Mn: 1.3%, P: 0.02%, S: 0.004%, Cr: 0.2%, B: 0.0020%, Ti: 0.01%, Al: 0.002%, N: 0.004%, O: 0.0150%, and the balance: Fe and inevitable impurities.

Si was subsequently added to molten steel to a concentration of 0.15%. The molten steel was charged into a mold, which was repeated 5 times at intervals of 30 seconds after the Si addition.

Each casting product obtained was heated to 1250° C. and hot rolled into a 2.8 mm thick hot-rolled steel sheet with a finishing temperature of 900° C. and a coiling temperature of 600° C. The hot-rolled steel sheet was cold rolled after pickling and a 1.4 mm thick cold-rolled steel sheet was obtained.

The results of analysis for chemical components of the cold-rolled steel sheets are shown in Table 2. Each of the steel sheets having numerical references of 2a-1, 2a-2, 2a-3, 2a-4, and 2a-5 falls within the component range of the present invention.

The cold-rolled steel sheets were immersed in a salt bath and annealed at 800° C. for 1 minute and steel sheets for hot stamping were obtained.

Hot stamping was carried out with the following procedure: each steel sheet for hot stamping was kept at 900° C. for 5 minutes and then immediately pressed and held for 30 seconds by a pair of water-cooled upper and lower plate dies.

A cross section of each hot stamped sample (hereinafter referred to as a HS sample), which was taken parallel to a cold rolling direction, was observed using SEM. The size and the density of both Mn oxides and Mn—Si composite oxides were measured by the aforementioned methods.

Vickers hardness of the cross section of each HS sample parallel to the cold-rolling direction was also measured. The Vickers hardness was measured at a total of 10 points including 5 points located at one fourth of the thickness and 5 points at three fourths of the thickness from one surface of the HS sample. The 10 measurements were averaged to obtain a cross sectional surface hardness. The test load applied to the indenter was 1 kgf.

A 100 mm by 100 mm test piece for evaluation of delayed fracture resistance and a test piece for the Charpy test were taken from each of the HS samples.

A hole of 10 mmφ was pierced with the center of the hole being aligned with the intersection of the diagonals of the 100 mm by 100 mm test piece. The clearances were 8.9% (10.25 mmφ), 12.5% (10.35 mmφ), 21.4% (10.60 mmφ), and 28.6% (10.80 mmφ), where the figure in the bracket shows the inner diameter of each die. The number of piercings were 5 per each clearance. The wall surface of each pierced hole was observed in detail to identify presence or absence of cracks.

Regarding test pieces for the Charpy test, the longitudinal direction of each test piece was aligned parallel to the cold rolling direction.

The Charpy tests were conducted at test temperatures of 20° C., 0° C., −20° C., −40° C., −60° C., −80° C., −100° C., and −120° C., and a ductile-brittle transition temperature was determined based on changes in absorbed energy.

The results of the tests described above are put together in Table 3.

No Mn oxide having the maximum length exceeded 5 μm was observed. Also, no Mn—Si composite oxide having the longitudinal length exceeded 10 μm was observed. The maximum length of detected Mn oxides and the short-axial length of detected Mn—Si composite oxides were both 1 μm or more.

The density of Mn oxides was observed to decrease as the elapsed time between the Si addition and the casting became longer, whereas the density of Mn—Si composite oxides increased.

Such changes in the densities of the oxides correspond well to changes in the concentrations of Si and 0 among chemical components of the cold-rolled steel sheet and thus can be explained by the progress in deoxidation by Si.

More particularly, (1) Si oxides float to the upper portion of molten steel, resulting in a lower Si concentration in the steel sheet;

(2) O concentration decreases in the steel sheet due to deoxidation by Si;

(3) Mn oxides, which have been formed before Si addition, are reduced by Si and the density thereof decreases; and (4) Some Mn oxides are replaced with Mn—Si composite oxides.

Although (3) and (4) are possible reactions, details are uncertain.

It is found that the results of piercing tests are closely related to the density of Mn oxides. More particularly, while crack generation was not observed for any case of clearance if the density was $5.0 \times 10^3$ pieces per mm$^2$ or more, crack generation was observed for any case of clearance if the density was $4.9 \times 10^3$ pieces per mm$^2$ Consequently, the lower limit of the Mn oxide density effective to restrain delayed fractures was set to $5 \times 10^3$ pieces per mm$^2$.

It was found that the ductile-brittle transition temperature was closely related to the density of Mn—Si composite oxides. In other words, it became apparent that, while the temperature was more or less −65° C. if the density was $1.7 \times 10^2$ pieces per mm$^2$ or more, if the density was 83 pieces per mm$^2$, the temperature was −35° C., that is, the low-temperature toughness was considerably deteriorated. Consequently, the lower limit of the Mn—Si composite oxide density effective to secure the low-temperature toughness was set to $1.7 \times 10^2$ pieces per mm$^2$ the following procedure: each steel sheet for hot stamping was kept at 900° C. for 5 minutes, and then the steel sheet was immediately pressed and held for 30 seconds by a pair of water-cooled upper and lower plate dies. A cross section of each HS sample, which was taken parallel to a cold rolling direction, was observed using SEM and the size and the density of both Mn oxides and Mn—Si composite oxides were measured by the aforementioned methods.

Vickers hardness of the cross section of each HS sample parallel to the cold-rolling direction was also measured. Measuring points and measuring conditions were the same as in Example 2. The delayed fracture resistance of the HS samples

TABLE 2

| Steel reference | Elapsed time between Si addition and casting (seconds) | C | Si | Mn | P | S | Cr | B | Ti | Al | N | O |
|---|---|---|---|---|---|---|---|---|---|---|---|---|
| 2a-1 | 30  | 0.31 | 0.15 | 1.3 | 0.02 | 0.004 | 0.2 | 0.0020 | 0.01 | 0.002 | 0.004 | 0.0120 |
| 2a-2 | 60  | 0.30 | 0.12 | 1.3 | 0.02 | 0.004 | 0.2 | 0.0020 | 0.01 | 0.002 | 0.004 | 0.0104 |
| 2a-3 | 90  | 0.31 | 0.11 | 1.3 | 0.02 | 0.004 | 0.2 | 0.0018 | 0.01 | 0.002 | 0.004 | 0.0079 |
| 2a-4 | 120 | 0.30 | 0.10 | 1.3 | 0.02 | 0.004 | 0.2 | 0.0020 | 0.01 | 0.002 | 0.004 | 0.0059 |
| 2a-5 | 150 | 0.30 | 0.10 | 1.3 | 0.02 | 0.004 | 0.2 | 0.0022 | 0.01 | 0.002 | 0.004 | 0.0062 |

The unit of chemical components is % by mass.

TABLE 3

| No. | Steel | Density of Mn oxides (pieces/mm$^2$) | Densityty of Mn—Si composite oxides (pieces/mm$^2$) | Cross-sectional hardness of HS sample | Crack generation per clearance ○: Not observed X: Observed | | | | Ductile-brittle transiton temperature (° C.) | |
|---|---|---|---|---|---|---|---|---|---|---|
| | | | | | 8.9% | 12.5% | 21.4% | 28.6% | | |
| 1 | 2a-1 | $8.2 \times 10^4$ | <u>83</u> | 602 | ○ | ○ | ○ | ○ | −35 | Comparative example |
| 2 | 2a-2 | $1.4 \times 10^4$ | $1.7 \times 10^2$ | 597 | ○ | ○ | ○ | ○ | −68 | Present invention |
| 3 | 2a-3 | $9.6 \times 10^3$ | $1.7 \times 10^3$ | 599 | ○ | ○ | ○ | ○ | −64 | Present invention |
| 4 | 2a-4 | $5.0 \times 10^3$ | $2.2 \times 10^3$ | 604 | ○ | ○ | ○ | ○ | −66 | Present invention |
| 5 | 2a-5 | <u>$4.9 \times 10^3$</u> | $2.5 \times 10^3$ | 596 | X | X | X | X | −61 | Comparative example |

The underlined falls out of the range of the present invention.

Example 3

Raw materials were melted using a small-scale melting furnace and the chemical components were adjusted so as to contain: C: 0.36%, Mn: 1.2%, P: 0.01%, S: 0.002%, Cr: 0.2%, B: 0.0025%, Ti: 0.02%, Al: 0.002%, N: 0.003%, O: 0.0160%, and the balance: Fe and inevitable impurities. Si was subsequently added to molten steel to a concentration of 0.16%. The molten steel was charged into 5 molds, 20 seconds after Si addition, with a short elapsed time between charges. The casting products were heated to 1200° C. and hot rolled into 2.8 mm thick hot-rolled steel sheets with a finishing temperature of 900 to 910° C. and a coiling temperature of 600° C. The hot-rolled steel sheets were cold rolled after pickling and 1.4 mm thick cold-rolled steel sheets were obtained. The results of chemical component analysis of the cold-rolled steel sheets are shown in Table 4. Each of the steel sheets having numerical references of 3a-1, 3a-2, 3a-3, 3a-4, and 3a-5 falls within the component range of the present invention.

The cold-rolled steel sheets were immersed in a salt bath and annealed at 780° C. for 1 minute and steel sheets for hot stamping were obtained. Hot stamping was carried out with (observation of crack generation on the surface of pierced holes) and the low-temperature toughness (determination of the ductile-brittle transition temperature by the Charpy test) were evaluated. The method and the conditions are the same as in Example 2. The results of the tests are put together in Table 5.

No Mn oxide having the maximum length of 5 μm or more was observed. Also, no Mn—Si composite oxide having the longitudinal length exceeded 10 μm was observed. There was shown the same tendency as in Example 2 in the relation between the density of Mn oxides as well as the density of Mn—Si oxides and the elapsed time between Si addition and casting. It became apparent that if the elapsed time between Si addition and casting was 35 to 145 seconds, the densities of both Mn oxides and Mn—Si composite oxides fell within the range of the present invention, and consequently steel sheets excellent in the delayed fracture resistance and in the low temperature toughness were obtained.

TABLE 4

| Steel reference | Elapsed time between Si addition and casting (seconds) | C | Si | Mn | P | S | Cr | B | Ti | Al | N | O |
|---|---|---|---|---|---|---|---|---|---|---|---|---|
| 3a-1 | 20 | 0.36 | 0.16 | 1.2 | 0.01 | 0.002 | 0.2 | 0.0024 | 0.02 | 0.002 | 0.003 | 0.0135 |
| 3a-2 | 35 | 0.36 | 0.14 | 1.2 | 0.01 | 0.002 | 0.2 | 0.0025 | 0.02 | 0.002 | 0.003 | 0.0112 |
| 3a-3 | 80 | 0.36 | 0.12 | 1.2 | 0.01 | 0.002 | 0.2 | 0.0025 | 0.02 | 0.002 | 0.003 | 0.0084 |
| 3a-4 | 145 | 0.35 | 0.11 | 1.2 | 0.01 | 0.002 | 0.2 | 0.0025 | 0.02 | 0.002 | 0.003 | 0.0062 |
| 3a-5 | 165 | 0.36 | 0.11 | 1.2 | 0.01 | 0.002 | 0.2 | 0.0025 | 0.02 | 0.002 | 0.003 | 0.0058 |

The unit of chemical components is % by mass.

TABLE 5

| No. | Steel | Density of Mn oxides (pieces/mm$^2$) | Density of Mn—Si composite oxides (pieces/mm$^2$) | Cross-sectional hardness of HS sample | Crack generation per clearance ○: Not observed X: Observed | | | | Ductile-brittle transition temperature (° C.) | |
|---|---|---|---|---|---|---|---|---|---|---|
| | | | | | 8.9% | 12.5% | 21.4% | 28.6% | | |
| 1 | 3a-1 | $8.2 \times 10^4$ | 0 (not detected) | 678 | ○ | ○ | ○ | ○ | −26 | Comparative example |
| 2 | 3a-2 | $1.5 \times 10^4$ | $2.5 \times 10^2$ | 681 | ○ | ○ | ○ | ○ | −58 | Present invention |
| 3 | 3a-3 | $1.0 \times 10^4$ | $9.2 \times 10^2$ | 880 | ○ | ○ | ○ | ○ | −55 | Present invention |
| 4 | 3a-4 | $5.3 \times 10^3$ | $1.7 \times 10^3$ | 674 | ○ | ○ | ○ | ○ | −56 | Present invention |
| 5 | 3a-5 | $\underline{4.7 \times 10^3}$ | $3.3 \times 10^3$ | 677 | X | X | X | X | −54 | Comparative example |

The underlined falls out of the range of the present invention.

Example 4

Raw materials were melted using a small-scale melting furnace and a plurality of casting products with different chemical components were prepared. The chemical components targeted were in the following ranges: C: 0.2 to 0.43%, Mn: 0.2 to 2.2%, P: 0.02% or less, S: 0.004% or less, Cr: 0.1 to 2.5%, B: 0.0020 to 0.0035%, Ti: 0.01 to 0.05%, Al: 0.003 to 0.04%, N: 0.004% or less, O: 0.020% or less, and the balance: Fe and inevitable impurities.

For each case, the components excluding Si were adjusted first and Si (equivalent to 0.01 to 0.5%) was added in molten steel. Then, 90 seconds after the Si addition, the molten steel was casted in molds.

Resulted casting products were cold rolled into 1.4 mm thick cold-rolled steel sheets with the same conditions as in Example 2. Chemical components obtained by analysis of the cold-rolled steel sheets are shown in Table 6.

The cold-rolled steel sheets were annealed in the same way and under the same conditions as in Example 2. The size and the density of both Mn oxides and Mn—Si composite oxides in the steel sheets were measured.

Hot stamping was subsequently carried out with the same method and conditions as in Example 2. For each of the steel sheets, measurement of the cross-sectional hardness, evaluation of the delayed fracture resistance using the piercing test, and evaluation of the low-temperature toughness using the Charpy test were carried out. Testing conditions were the same as in Example 2.

The test results were shown in Table 7.

No Mn oxide having the maximum length of 5 μm or more was observed. Also, no Mn—Si composite oxide having the longitudinal length exceeded 10 μm was observed. The maximum length of detected Mn oxides and the short-axial length of detected Mn—Si composite oxides were both 1 μm or more.

It became apparent that the crack generation based on the piercing test is closely related to the density of Mn oxides. More particularly, No. 1, No. 8, and No. 15, in which the density of Mn oxides was not within the range of the present invention, exhibited the crack generation for each of four clearances, and also deterioration in the delayed fracture resistance. For No. 1, it is likely that a required Mn oxide density was not obtained because the Mn concentration in the steel sheet was out of the range of the present invention. For No. 8, it is likely that a required Mn oxide density was not obtained because the O concentration in the steel sheet was out of the range of the present invention. For No. 15, it is likely that a required Mn oxide density was not obtained because the Al concentration in the steel sheet was out of the range of the present invention and deoxidation by Al became dominant.

It is apparent that the ductile-brittle transition temperature, which is an indicator of the low-temperature toughness, is closely related to the density of Mn—Si composite oxides. No. 8, in which the O concentration and the density of Mn—Si composite oxides in the steel sheet are out of the range of the present invention, has a ductile-brittle transition temperature of −25° C. In contrast, the ductile-brittle transition temperatures are −55 to −52° C. for Nos. 9 to 11 each of which has the cross-sectional hardness of the HS sample being similar to that of No. 8 but the density of Mn—Si composite oxides within the range of the present invention. This shows that No. 8 is inferior in the low-temperature toughness.

Moreover, the ductile-brittle transition temperature is −20° C. for No. 12 in which the Si concentration and the density of Mn—Si composite oxides in the steel sheet are out of the range of the present invention. Similarly, the ductile-brittle transition temperature is −17° C. for No. 15 in which the Al concentration and the density of Mn—Si composite oxides in the steel sheet are out of the range of the present invention. In contrast, the ductile-brittle transition temperatures are −51° C. and −50° C. for No. 13 and No. 14, respectively, each of which has the density of Mn—Si composite oxides within the range of the present invention although the cross-sectional hardness of the HS sample is similar to those of No. 12 and No. 15. This shows that No. 12 and No. 15 are inferior in the low-temperature toughness.

TABLE 6

| Steel reference | C | Si | Mn | P | S | Cr | B | Ti | Al | N | O | |
|---|---|---|---|---|---|---|---|---|---|---|---|---|
| 3a | 0.20 | 0.15 | 0.15 | 0.02 | 0.004 | 0.3 | 0.0020 | 0.01 | 0.01 | 0.004 | 0.0080 | Comparative example |
| 3b | 0.20 | 0.12 | 0.2 | 0.02 | 0.004 | 0.3 | 0.0021 | 0.01 | 0.01 | 0.003 | 0.0075 | Present invention |
| 3c | 0.21 | 0.12 | 1.3 | 0.01 | 0.004 | 0.3 | 0.0020 | 0.01 | 0.01 | 0.003 | 0.0060 | Present invention |
| 3d | 0.20 | 0.10 | 2.2 | 0.01 | 0.003 | 0.3 | 0.0020 | 0.02 | 0.01 | 0.002 | 0.0070 | Present invention |
| 3e | 0.28 | 0.12 | 0.6 | 0.02 | 0.002 | 0.1 | 0.0035 | 0.03 | 0.02 | 0.003 | 0.0044 | Present invention |
| 3f | 0.28 | 0.12 | 0.6 | 0.01 | 0.002 | 1.5 | 0.0035 | 0.01 | 0.01 | 0.003 | 0.0034 | Present invention |
| 3g | 0.29 | 0.10 | 0.6 | 0.01 | 0.002 | 2.5 | 0.0032 | 0.01 | 0.01 | 0.002 | 0.0022 | Present invention |
| 3h | 0.36 | 0.15 | 1.2 | 0.01 | 0.002 | 0.3 | 0.0030 | 0.02 | 0.005 | 0.003 | 0.0015 | Comparative example |
| 3i | 0.36 | 0.10 | 1.3 | 0.01 | 0.002 | 0.2 | 0.0030 | 0.02 | 0.01 | 0.003 | 0.004 | Present invention |
| 3j | 0.36 | 0.10 | 1.3 | 0.01 | 0.002 | 0.2 | 0.0030 | 0.02 | 0.01 | 0.002 | 0.012 | Present invention |
| 3k | 0.37 | 0.15 | 0.8 | 0.02 | 0.004 | 0.2 | 0.0029 | 0.01 | 0.01 | 0.004 | 0.020 | Present invention |
| 3l | 0.42 | 0.005 | 0.8 | 0.01 | 0.002 | 0.2 | 0.0020 | 0.02 | 0.006 | 0.003 | 0.0065 | Comparative example |
| 3m | 0.42 | 0.06 | 0.8 | 0.02 | 0.004 | 0.2 | 0.0020 | 0.01 | 0.01 | 0.004 | 0.0050 | Present invention |
| 3n | 0.41 | 0.5 | 0.8 | 0.02 | 0.004 | 0.2 | 0.0020 | 0.01 | 0.01 | 0.004 | 0.0049 | Present invention |
| 3o | 0.42 | 0.1 | 0.8 | 0.02 | 0.004 | 0.2 | 0.0020 | 0.01 | 0.04 | 0.004 | 0.0035 | Comparative example |

The unit of above figures is % by mass.
The underlined falls out of the range of the present invention.

TABLE 7

| No. | Steel | Density of Mn oxides (pieces/mm$^2$) | Density of Mn—Si composite oxides (pieces/mm$^2$) | Cross-sectional hardness of HS sample | Crack generation per clearance ○: Not observed X: Observed | | | | Ductile-brittle transition temperature (° C.) | |
|---|---|---|---|---|---|---|---|---|---|---|
| | | | | | 8.9% | 12.5% | 21.4% | 28.6% | | |
| 1 | 3a | 3.9 ×10$^3$ | 8.3 × 10$^2$ | 411 | X | X | X | X | −60 | Comparative example |
| 2 | 3b | 2.2 × 10$^4$ | 5.0 × 10$^2$ | 455 | ○ | ○ | ○ | ○ | −66 | Present invention |
| 3 | 3c | 5.8 × 10$^4$ | 6.7 × 10$^2$ | 459 | ○ | ○ | ○ | ○ | −69 | Present invention |
| 4 | 3d | 7.1 × 10$^4$ | 5.0 × 10$^2$ | 457 | ○ | ○ | ○ | ○ | −64 | Present invention |
| 5 | 3e | 3.4 × 10$^4$ | 6.7 × 10$^2$ | 549 | ○ | ○ | ○ | ○ | −60 | Present invention |
| 6 | 3f | 2.1 × 10$^4$ | 6.7 × 10$^2$ | 551 | ○ | ○ | ○ | ○ | −62 | Present invention |
| 7 | 3g | 1.6 × 10$^4$ | 5.0 × 10$^2$ | 566 | ○ | ○ | ○ | ○ | −60 | Present invention |
| 8 | 3h | 2.6 ×10$^3$ | 83 | 601 | X | X | X | X | −25 | Comparative example |
| 9 | 3i | 5.7 × 10$^4$ | 4.2 × 10$^2$ | 614 | ○ | ○ | ○ | ○ | −53 | Present invention |
| 10 | 3j | 8.2 × 10$^4$ | 4.2 × 10$^2$ | 610 | ○ | ○ | ○ | ○ | −55 | Present invention |
| 11 | 3k | 9.6 × 10$^4$ | 6.7 × 10$^2$ | 617 | ○ | ○ | ○ | ○ | −52 | Present invention |
| 12 | 3l | 3.6 × 10$^4$ | 0 (not detected) | 620 | ○ | ○ | ○ | ○ | −20 | Comparative example |
| 13 | 3m | 4.2 × 10$^4$ | 2.5 × 10$^2$ | 633 | ○ | ○ | ○ | ○ | −51 | Present invention |

TABLE 7-continued

| No. | Steel | Density of Mn oxides (pieces/mm$^2$) | Density of Mn—Si composite oxides (pieces/mm$^2$) | Cross-sectional hardness of HS sample | Crack generation per clearance ○: Not observed X: Observed | | | | Ductile-brittle transition temperature (° C.) | |
|---|---|---|---|---|---|---|---|---|---|---|
| | | | | | 8.9% | 12.5% | 21.4% | 28.6% | | |
| 14 | 3n | 4.7 × 10$^4$ | 2.7 × 10$^3$ | 638 | ○ | ○ | ○ | ○ | −50 | Present invention |
| 15 | 3o | <u>1.4 ×10$^3$</u> | <u>0 (not detected)</u> | 618 | X | X | X | X | −17 | Comparative example |

The underlined falls out of the range of the present invention.

Example 5

Raw materials were melted using a small-scale melting furnace and a plurality of casting products with different chemical components were prepared. The chemical components targeted were in the following ranges: C: 0.2 to 0.36%, Mn: 0.2 to 1.3%, P: 0.02% or less, S: 0.004% or less, Cr: 0.1 to 1.5%, B: 0.0020 to 0.0035%, Ti: 0.01 to 0.03%, Al: 0.002 to 0.02%, N: 0.004% or less, O: 0.010% or less, Nb: 0.03 to 0.07% (4c, 4f, 4h), Mo: 0.2 to 0.5% (4a, 4g), W: 0.1 to 0.3% (4b, 4i), V: 0.1 to 0.3% (4d, 4i), Ni: 0.3 to 0.5% (4e, 4j), Cu: 0.6 to 1.0% (4e, 4j), and the balance: Fe and inevitable impurities.

For each case, the components excluding Si were adjusted first and Si (equivalent to 0.15%) was added in molten steel. Then, 90 seconds after the Si addition, the molten steel was casted in molds.

Resulted casting products were cold rolled into 1.4 mm thick cold-rolled steel sheets with the same conditions as in Example 2. Chemical components obtained by analysis of the cold-rolled steel sheets are shown in Table 8.

Rectangular-shaped test pieces, which were cut out from the cold-rolled steel sheets, were annealed and then plated with Al using a hot-dip simulator. Annealing was carried out by keeping each of the test pieces for one minute at 800° C. The test piece was then immersed in a molten Al bath (Al-10% Si). After the test piece was taken out, the plating thickness (the weight of plating) was adjusted by gas jetting and the test piece was cooled to the room temperature to obtain a sample. The cooling rate was 15° C. per second until it dropped to 500° C. The weight of plating was 60 g per m$^2$ for each surface.

The size and the density of both Mn oxides and Mn—Si composite oxides in the steel sheet were measured. The thickness and constituent elements of the alloy layer were investigated. The alloy layer formed at the interface between the steel sheet and the plating layer had a thickness of 1 μm or more and 10 μm or less. The alloy layer of each of the steel sheets consisted of Fe, Al, Mn, Cr, and B. There was no Si observed in the alloy layer.

Hot stamping was subsequently carried out with the same method and conditions as in Example 2. For each of the steel sheets, measurement of the cross-sectional hardness, evaluation of the delayed fracture resistance using the piercing test, and evaluation of the low-temperature toughness using the Charpy test were carried out. Testing conditions were the same as in Example 2.

The test results are shown in Table 9. The Table 9 also lists comparative samples which are similar in chemical components excluding Nb, Mo, W, V, Ni, and Cu for comparison in terms of effects of such elements.

No Mn oxide having the maximum length of 5 μm or more was observed. Also, no Mn—Si composite oxide having the longitudinal length exceeded 10 μm was observed. The maximum length of detected Mn oxides and the short-axial length of detected Mn—Si composite oxides were both 1 μm or more.

The density of Mn oxides in each of the steel sheets fells within the range of the present invention. No crack generation was observed in the piercing test. The density of Mn—Si composite oxides in each of the steel sheets fells within the range of the present invention.

No. 3 and No. 6 each containing Nb, when compared to No. 6 in Example 2 and No. 3 in Example 1, respectively, showed a remarkable decrease in the ductile-brittle transition temperature while showing no change in the cross-sectional hardness after hot stamping.

Nos. 1, 2, 4, 5, and Nos. 7 to 10 to which Mo, W, V, and Ni and Cu had been added showed substantially the same ductile-brittle transition temperature and exhibited an increase in the cross-sectional hardness of the HS sample, when compared to respective comparative samples.

The results showed that, if Nb, Mo, W, V, Ni, Cu are added within the range according to the present invention, the low-temperature toughness can be improved more and the cross-sectional hardness after hot stamping, i.e., the hardenability, can also be improved, without affecting the delayed fracture resistance.

TABLE 8

| Steel reference | C | Si | Mn | P | S | Cr | B | Ti | Al | N | O | Others | |
|---|---|---|---|---|---|---|---|---|---|---|---|---|---|
| 4a | 0.21 | 0.12 | 0.2 | 0.01 | 0.003 | 0.3 | 0.0022 | 0.01 | 0.01 | 0.003 | 0.0072 | Mo: 0.5 | Present invention |
| 4b | 0.21 | 0.12 | 1.3 | 0.02 | 0.004 | 0.3 | 0.0020 | 0.02 | 0.01 | 0.003 | 0.0061 | W: 0.3 | Present invention |
| 4c | 0.28 | 0.10 | 0.6 | 0.02 | 0.003 | 0.1 | 0.0035 | 0.03 | 0.02 | 0.003 | 0.0045 | Nb: 0.07 | Present invention |
| 4d | 0.28 | 0.12 | 0.6 | 0.01 | 0.002 | 1.5 | 0.0035 | 0.01 | 0.01 | 0.003 | 0.0033 | V: 0.3 | Present invention |
| 4e | 0.29 | 0.11 | 0.6 | 0.01 | 0.002 | 1.4 | 0.0035 | 0.01 | 0.01 | 0.003 | 0.0034 | Ni: 0.5, Cu: 1.0 | Present invention |

TABLE 8-continued

| Steel reference | C | Si | Mn | P | S | Cr | B | Ti | Al | N | O | Others | |
|---|---|---|---|---|---|---|---|---|---|---|---|---|---|
| 4f | 0.30 | 0.12 | 1.3 | 0.02 | 0.004 | 0.2 | 0.0018 | 0.01 | 0.002 | 0.004 | 0.0075 | Nb: 0.03 | Present invention |
| 4g | 0.31 | 0.11 | 1.3 | 0.02 | 0.004 | 0.2 | 0.0018 | 0.01 | 0.002 | 0.004 | 0.0079 | Mo: 0.2 | Present invention |
| 4h | 0.36 | 0.10 | 1.2 | 0.02 | 0.003 | 0.2 | 0.0030 | 0.02 | 0.01 | 0.003 | 0.0043 | Nb: 0.05, Mo: 0.3 | Present invention |
| 4i | 0.35 | 0.10 | 1.3 | 0.01 | 0.002 | 0.2 | 0.0028 | 0.02 | 0.01 | 0.003 | 0.0044 | W: 0.1, V: 0.1 | Present invention |
| 4j | 0.36 | 0.10 | 1.3 | 0.02 | 0.002 | 0.2 | 0.0030 | 0.03 | 0.01 | 0.003 | 0.0042 | Ni: 0.3, Ca: 0.6 | Present invention |

The unit of above figures is % by mass.

TABLE 9

| No. | Steel | Comparable case | Constituent elements of alloy layer at interface between steel sheet and plating layer | Density of Mn oxides (pieces/mm$^2$) | Density of Mn—Si composite oxides (pieces/mm$^2$) | Cross-sectional hardness of HS sample | Crack generation per clearance ◯: Not observed X: Observed | | | | Ductile-brittle transition temperature (° C.) | |
|---|---|---|---|---|---|---|---|---|---|---|---|---|
| | | | | | | | 8.9% | 12.5% | 21.4% | 28.6% | | |
| 1 | 4a | No. 2 of Example 3 | Fe, Al, Mn, Cr, B | 2.3 × 10$^4$ | 5.0 × 10$^2$ | 475 | ◯ | ◯ | ◯ | ◯ | −65 | Present invention |
| 2 | 4b | No. 3 of Example 2 | Fe, Al, Mn, Cr, B | 5.7 × 10$^4$ | 6.7 × 10$^2$ | 478 | ◯ | ◯ | ◯ | ◯ | −70 | Present invention |
| 3 | 4c | No. 6 of Example 2 | Fe, Al, Mn, Cr, B | 3.5 × 10$^4$ | 6.7 × 10$^2$ | 549 | ◯ | ◯ | ◯ | ◯ | −72 | Present invention |
| 4 | 4d | No. 7 of Example 2 | Fe, Al, Mn, Cr, B | 2.2 × 10$^4$ | 6.7 × 10$^2$ | 572 | ◯ | ◯ | ◯ | ◯ | −61 | Present invention |
| 5 | 4e | No. 7 of Example 2 | Fe, Al, Mn, Cr, B | 2.3 × 10$^4$ | 6.7 × 10$^2$ | 570 | ◯ | ◯ | ◯ | ◯ | −63 | Present invention |
| 6 | 4f | No. 3 of Example 2 | Fe, Al, Mn, Cr, B | 9.5 × 10$^3$ | 1.7 × 10$^3$ | 461 | ◯ | ◯ | ◯ | ◯ | −77 | Present invention |
| 7 | 4g | No. 3 of Example 1 | Fe, Al, Mn, Cr, B | 9.4 × 10$^3$ | 1.7 × 10$^3$ | 617 | ◯ | ◯ | ◯ | ◯ | −64 | Present invention |
| 8 | 4h | No. 12 of Example 2 | Fe, Al, Mn, Cr, B | 5.6 × 10$^4$ | 4.2 × 10$^2$ | 633 | ◯ | ◯ | ◯ | ◯ | −52 | Present invention |
| 9 | 4i | No. 12 of Example 2 | Fe, Al, Mn, Cr, B | 5.8 × 10$^4$ | 4.2 × 10$^2$ | 615 | ◯ | ◯ | ◯ | ◯ | −54 | Present invention |
| 10 | 4j | No. 12 of Example 2 | Fe, Al, Mn, Cr, B | 5.5 × 10$^3$ | 4.2 × 10$^2$ | 612 | ◯ | ◯ | ◯ | ◯ | −54 | Present invention |

Example 6

Raw materials were melted using a small-scale melting furnace and two casting products with different chemical components were prepared. The chemical components targeted for one piece were as follows: C: 0.22%, Mn: 1.3%, P: 0.02% or less, S: 0.004% or less, Cr: 0.3%, B: 0.0025%, Ti: 0.01%, Al: 0.01%, N: 0.004% or less, O: 0.010% or less, and the balance: Fe and inevitable impurities. The chemical components targeted for the other piece were as follows: C: 0.32%, Mn: 0.6%, P: 0.01% or less, S: 0.002% or less, Cr: 0.3%, B: 0.0025%, Ti: 0.01%, Al: 0.01%, N: 0.003% or less, O: 0.0050% or less, and the balance: Fe and inevitable impurities.

The components excluding Si were adjusted first for both cases. Si of equivalent to 0.06% was then added in molten steel for the former case and Si of equivalent to 0.25% for the latter. For both cases, the molten steel was casted in molds 90 seconds after the Si addition.

These casting products were heated to 1200° C. and hot rolled to produce steel sheets of different thickness with a finishing temperature of 900° C. The thicknesses of hot-rolled steel sheets were 5.6 mm, 3.5 mm, 3.0 mm, 2.3 mm, and 1.9 mm. The coiling temperature was 650° C. for each thickness.

After pickling, the hot-rolled steel sheets were cold rolled into cold-rolled steel sheets having the same thickness of 1.4 mm but different reduction ratios.

The chemical components obtained by analysis of cold-rolled steel sheets are shown in Table 10.

The cold-rolled steel sheets were subsequently annealed using a salt bath. The annealing condition was keeping the steel sheets for 1 minute at 760° C.

Test pieces having dimensions of 200 mm by 150 mm were taken and then hot stamped. Each test piece was kept at 900° C. for 5 minutes and then immediately pressed and held for 30 seconds by a pair of water-cooled upper and lower plate dies.

The size and the density of both Mn oxides and Mn—Si composite oxides were investigated by the same method as in Example 2.

By following the same procedure as in Example 2, the cross-sectional hardness of the HS sample was measured, and the delayed fracture resistance and the low-temperature toughness were investigated based on the piercing test (the presence or absence of cracks) and the Charpy test respectively.

The test results are shown in Table 11.

No Mn oxide having the maximum length of 5 μm or more was observed for any of the steel sheets. The density was approximately the same for every steel sheet, regardless of the cold-rolling reduction ratio. It is noted, however, that Nos. 1 and 6 having a cold-rolling reduction ratio of 25% and Nos. 5 and 10 having a cold-rolling reduction ratio of 74% were observed to have less voids around oxides than the other three steel sheets of different cold-rolling reduction ratios. As a result, Nos. 1, 5, 6, and 10 were less capable of hydrogen trapping, which was determined to cause a failure to restrain crack generation for the steel sheets pierced with clearances of 21.4% and 28.6%.

The density of Mn—Si composite oxides was almost the same in the cases of cold-rolling reduction ratios of 25% and 40% whereas the density increased in the case of 47% or more and considerably increased in the case of 74%.

Mn—Si composite oxides have a drawing property in cold rolling. With a reduction ratio of 25%, however, a proportion of drawn oxides is not large. As the reduction ratio increased to 40%, 47%, and 61%, the proportion of drawn oxides was observed to increase. With the reduction ratio of 74%, however, the proportion of drawn oxides decreased to a level of the reduction ratio of 25% although the oxides having a longitudinal length exceeding 10 μm were sporadically observed. This is probably because some of the drawn oxides were split, which led to the observed results that the proportion of drawn oxides decreased while the density of the oxides considerably increased. The maximum length of detected Mn oxides and the short-axial length of detected Mn—Si composite oxides are both 1 μm or more.

Figure 4:
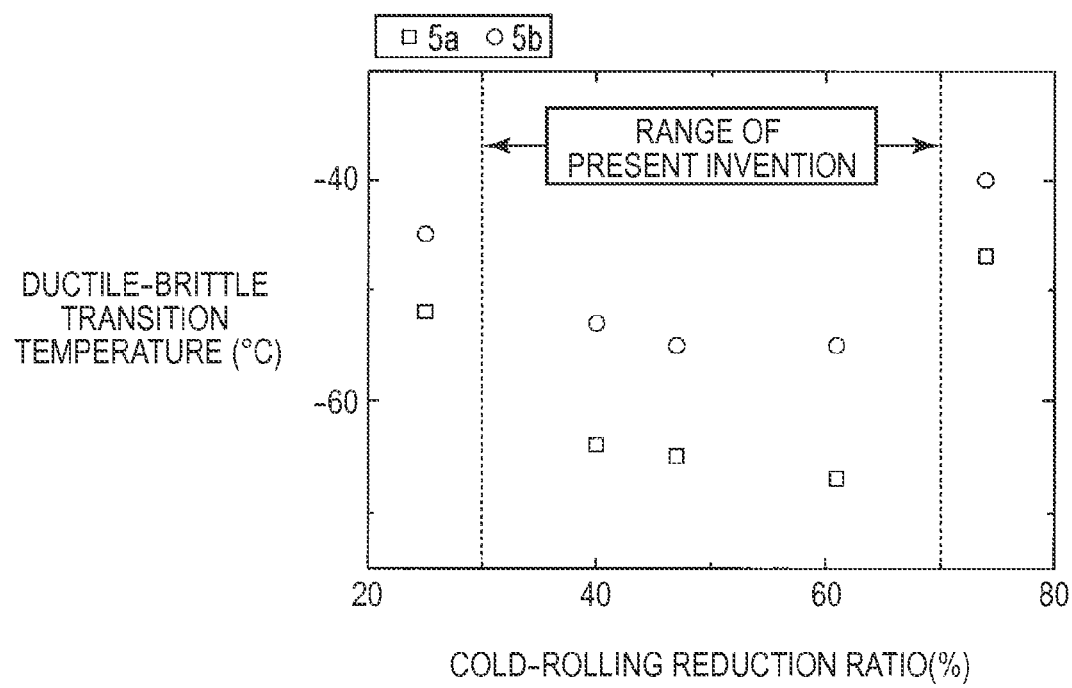
FIG. 4 illustrates a relation between cold-rolling reduction ratio (%) and ductile-brittle transition temperature (° C.).

The cold-rolling reduction ratio in cold rolling is very important because it strongly affects the low-temperature toughness through the proportion of drawn oxides. The cold-rolling reduction ratio needs to be 35 to 70%. FIG. 4 illustrates a relation between the cold-rolling reduction ratio and the ductile-brittle transition temperature, the figures of which are shown in Table 11. It is found that the ductile-brittle transition temperature can be made lower, and steel sheets excellent in the low-temperature toughness can be obtained by limiting the cold-rolling reduction ratio to the range of the present invention.

TABLE 10

| Steel reference | C | Si | Mn | P | S | Cr | B | Ti | Al | N | O | |
|---|---|---|---|---|---|---|---|---|---|---|---|---|
| 5a | 0.22 | 0.06 | 1.3 | 0.02 | 0.004 | 0.3 | 0.0025 | 0.01 | 0.01 | 0.004 | 0.0078 | Present invention |
| 5b | 0.32 | 0.20 | 0.6 | 0.01 | 0.002 | 0.3 | 0.0025 | 0.01 | 0.01 | 0.003 | 0.0044 | Present invention |

The unit of above figures is % by mass.

TABLE 11

| No. | Steel | Cold-rolling reduction ratio (thickness of hot-rolled sheet) | Density of Mn oxides (pieces/mm$^2$) | Density of Mn—Si composite oxides (pieces/mm$^2$) | Cross-sectional hardness of HS sample | Crack generation per clearance ○: Not observed X: Observed | | | | Ductile-brittle transition temperature (° C.) | |
|---|---|---|---|---|---|---|---|---|---|---|---|
| | | | | | | 8.9% | 12.5% | 21.4% | 28.6% | | |
| 1 | 5a | 25% (5.6 mm) | 1.8 × 10$^4$ | 2.5 × 10$^2$ | 450 | ○ | ○ | X | X | −52 | Comparative example |
| 2 | | 40% (3.5 mm) | 1.9 × 10$^4$ | 2.5 × 10$^2$ | 452 | ○ | ○ | ○ | ○ | −64 | Present invention |
| 3 | | 47% (3.0 mm) | 1.9 × 10$^4$ | 1.6 × 10$^3$ | 455 | ○ | ○ | ○ | ○ | −65 | Present invention |
| 4 | | 61% (2.3 mm) | 1.8 × 10$^4$ | 1.7 × 10$^3$ | 451 | ○ | ○ | ○ | ○ | −67 | Present invention |
| 5 | | 74% (1.9 mm) | 1.9 × 10$^4$ | 3.5 × 10$^3$ | 460 | ○ | ○ | X | X | −47 | Comparative example |
| 6 | 5b | 25% (5.6 mm) | 1.3 × 10$^4$ | 8.3 × 10$^2$ | 600 | ○ | ○ | X | X | −45 | Comparative example |
| 7 | | 40% (3.5 mm) | 1.2 × 10$^4$ | 7.5 × 10$^2$ | 594 | ○ | ○ | ○ | ○ | −53 | Present invention |
| 8 | | 47% (3.0 mm) | 1.3 × 10$^4$ | 8.3 × 10$^2$ | 592 | ○ | ○ | ○ | ○ | −55 | Present invention |
| 9 | | 61% (2.3 mm) | 1.3 × 10$^4$ | 1.1 × 10$^3$ | 590 | ○ | ○ | ○ | ○ | −55 | Present invention |
| 10 | | 74% (1.9 mm) | 1.5 × 10$^4$ | 3.1 × 10$^3$ | 602 | ○ | ○ | X | X | −40 | Comparative example |

The underlined falls out of the range of the present invention.

Example 7

Raw materials were melted using a small-scale melting furnace and casting products were prepared. The chemical components targeted were as follows: C: 0.26%, Mn: 1.0%, P: 0.02% or less, S: 0.004% or less, Cr: 0.3%, B: 0.0020%, Ti: 0.01%, Al: 0.01%, N: 0.004% or less, O: 0.010% or less, and the balance: Fe and inevitable impurities.

The components excluding Si were adjusted first and Si equivalent to 0.15% was added in molten steel. Then, 90 seconds after the Si addition, the molten steel was casted in a mold for each case.

The casting products were heated to 1250° C. and hot rolled into 3.0 mm thick hot-rolled steel sheets with a finishing temperature of 910° C., and a coiling temperature was 600° C. After pickling, the hot-rolled steel sheets were cold rolled to obtain 1.5 mm thick cold-rolled steel sheets.

Chemical components obtained by analysis of the cold-rolled steel sheets are shown in Table 12.

The cold-rolled steel sheets were then annealed and successively plated using a hot-dip simulator. The annealing was carried out by keeping the steel sheet for 1 minute at 760° C. The types of plating included Al plating, Zn plating, and alloying Zn plating.

For Al plating, an Al-10% Si bath with a bath temperature of 670° C. was used and the target plating thickness was set to 40 μm. For Zn plating, a Zn-0.15% Al bath with a bath temperature of 460° C. was used and the target plating thickness was set to 30 μm. Alloying of the Zn plating was carried out by heating to 480° C. The plating thickness was adjusted using a gas wiper for each plating type.

The plated steel sheets were hot stamped under a heating condition of 900° C. for 5 minutes. A non-plated steel sheet for the comparison purposes and an Al-plated steel sheet were hot stamped immediately after the heating was completed. In contrast, a Zn-plated steel sheet and an alloying Zn-plated steel sheet were air-cooled to 750° C. after the heating was completed, and then hot stamped. Each of the sheets was pressed and held for 30 seconds by a pair of water-cooled upper and lower dies and shaped into a flat board and a shape schematically illustrated in FIG. 5 (a hat shape). In FIG. 5, all the figures, which represent dimensions, are expressed in mm.

The size and the density of both Mn oxides and Mn—Si composite oxides in the flat-shaped HS samples were measured in the same way as in Example 2.

By following the same procedure as in Example 2, the cross-sectional hardness was measured, and the delayed fracture resistance and the low-temperature toughness were investigated based on the piercing test (the presence or absence of cracks) and on the Charpy test, respectively. During piercing tests, no plated steel sheets exhibited such defect as detachment at the interface between the plating and the base metal (steel sheet).

The test results are shown in Table 13. The results of the non-plated steel sheet are also shown. No Mn oxide having the maximum length of 5 μm or more was observed. Also, no Mn—Si composite oxide having the longitudinal length exceeded 10 μm was observed. In addition, the maximum length of detected Mn oxides and the short-axial length of detected Mn—Si composite oxides were both 1 μm or more.

The density of Mn oxides in each sample fell within the range of the present invention and no crack generation was observed for each type of clearance. The results showed that the excellent delayed fracture resistance of the present invention was developed even for plated steel sheets.

The density of Mn—Si composite oxides in each sample fell within the range of the present invention. It was shown that the excellent low-temperature toughness developed even for plated steel sheets.

The HS samples that were shaped into hat shapes were observed in detail. Dimensions of any of plated steel sheets after shaping were exactly the same as those of the non-plated steel sheets after shaping. No defects such as cracks or scores were found on the plating layer.

Vickers hardnesses were measured on the cross section (at the center of the thickness) along the dotted line shown in FIG. 5. Measuring points included P1 at the center of the top edge of the hat, points at 10 mm and 20 mm away from P1 along the dotted line, P2 at the end of the round portion on a shoulder, points at 10 mm, 20 mm, and 30 mm away from P2 along the dotted line, a point at 10 mm away from P3 at the end of a bottom edge along the dotted line. The results are shown in Table 14. Obtained Vickers hardnesses on the cross section of the HS sample were 480 to 488 along the top edge and the bottom edge, both of which had been stamped at a high cooling rate, and 459 to 469 along a vertical wall portion, which had been cooled at a relatively lower cooling rate. These results were the same regardless of existence or non-existence of plating and the type of plating.

The results showed that, by using the steel sheet according to the present invention, a high strength member can be easily produced and a plated steel sheet can also be used as the high strength steel sheet in order to add required properties including corrosion resistance, which are all excellent in the delayed fracture resistance and in the low-temperature toughness.

TABLE 12

| Steel reference | C | Si | Mn | P | S | Cr | B | Ti | Al | N | O | |
|---|---|---|---|---|---|---|---|---|---|---|---|---|
| 6a | 0.26 | 0.13 | 0.96 | 0.02 | 0.004 | 0.3 | 0.0022 | 0.01 | 0.01 | 0.004 | 0.0066 | Present invention |

The unit of above figures is % by mass.

TABLE 13

| No. | Plating type | Density of Mn oxides (pieces/mm$^2$) | Density of Mn—Si composite oxides (pieces/mm$^2$) | Cross-sectional hardness of HS sample | Crack generation per clearance ○: Not observed X: Observed | | | | Ductile-brittle transition temperature (° C.) | |
|---|---|---|---|---|---|---|---|---|---|---|
| | | | | | 8.9% | 12.5% | 21.4% | 28.6% | | |
| 1 | Not plated | 5.7 × 10$^4$ | 6.7 × 10$^2$ | 493 | ○ | ○ | ○ | ○ | −63 | Present invention |

TABLE 13-continued

| No. | Plating type | Density of Mn oxides (pieces/mm²) | Density of Mn—Si composite oxides (pieces/mm²) | Cross-sectional hardness of HS sample | Crack generation per clearance ○: Not observed X: Observed | | | | Ductile-brittle transition temperature (° C.) | |
|---|---|---|---|---|---|---|---|---|---|---|
| | | | | | 8.9% | 12.5% | 21.4% | 28.6% | | |
| 2 | Al plating | 5.6 × 10⁴ | 6.7 × 10² | 488 | ○ | ○ | ○ | ○ | −64 | Present invention |
| 3 | Zn plating | 5.7 × 10⁴ | 6.7 × 10³ | 490 | ○ | ○ | ○ | ○ | −65 | Present invention |
| 4 | Alloying Zn plating | 5.7 × 10⁴ | 6.7 × 10³ | 489 | ○ | ○ | ○ | ○ | −63 | Present invention |

TABLE 14

| No. | Plating type | Top edge | | | Vertical wall | | | | Bottom edge |
|---|---|---|---|---|---|---|---|---|---|
| | | 10 mm from P1 | 20 mm from P1 | P2 | 10 mm from P2 | 20 mm from P2 | 30 mm from P2 | 10 mm from P3 | |
| 1 | Not plated | 483 | 488 | 485 | 469 | 462 | 460 | 468 | 480 |
| 2 | Al plating | 480 | 483 | 483 | 466 | 462 | 458 | 468 | 482 |
| 3 | Zn plating | 482 | 486 | 484 | 466 | 460 | 460 | 462 | 486 |
| 4 | Alloying Zn plating | 481 | 484 | 486 | 469 | 465 | 459 | 484 | 488 |

Example 8

Raw materials were melted using a small-scale melting furnace and the chemical components were adjusted so as to contain: C: 0.26%, Mn: 2.2%, P: 0.02%, S: 0.004%, Cr: 0.2%, B: 0.0020%, Ti: 0.01%, Al: 0.002%, N: 0.004%, O: 0.020%, and the balance: Fe and inevitable impurities. Si was subsequently added to molten steel to a concentration of 0.17%. The molten steel was charged into a mold, which was repeated 6 times with the first charge 10 seconds after the Si addition and subsequent charges at intervals of 25 to 50 seconds.

Each casting product obtained was heated to 1200° C. and hot-rolled into a 2.8 mm thick hot-rolled steel sheet with a finishing temperature of 900° C. and a coiling temperature of 600° C. After pickling, the hot-rolled steel sheet was then cold rolled and a 1.4 mm thick cold-rolled steel sheet was obtained. The results of analysis for chemical components of the cold-rolled steel sheets are shown in Table 15. Chemical components of any steel sheet fall within the range of the present invention.

The resulted cold-rolled steel sheets were immersed in a salt bath and annealed at 800° C. for 1 minute and steel sheets for hot stamping were obtained. Hot stamping was carried out with the following procedure: each steel sheet for hot stamping was kept at 900° C. for 5 minutes and then taken out and immediately pressed and held for 30 seconds by a pair of water-cooled upper and lower plate dies.

A cross section of each hot stamped sample (hereinafter referred to as a HS sample), which was taken parallel to a cold rolling direction, was observed using SEM. The size and the density of both Mn oxides and Mn—Si composite oxides were measured by the aforementioned methods.

A test piece for tensile test in accordance with JIS No. 5 test specimen was extracted from the HS sample such that the tensile direction becomes perpendicular to the cold rolling direction. Tensile strength and an amount of elongation (a total elongation relative to the gauge length of 50 mm) were measured using this test piece.

A 100 mm by 100 mm test piece for evaluation of delayed fracture resistance and a test piece for the Charpy test were taken from each of the HS samples. Regarding test pieces for the Charpy test, the longitudinal direction of each test piece was aligned parallel to the cold rolling direction.

A hole of 10 mmϕ was pierced with the center of the hole being aligned with the intersection of the diagonals of the 100 mm by 100 mm test piece for the evaluation of delayed fracture resistance. The clearances were 8.9% (10.25 mmϕ), 12.5% (10.35 mmϕ), 21.4% (10.60 mmϕ), and 28.6% (10.80 mmϕ), where the figure in the bracket shows the inner diameter of each die. The number of piercings were 5 per clearance. The wall surface of each pierced hole was observed in detail to identify the presence or absence of cracks.

The Charpy tests were conducted at test temperatures of 20° C., 0° C., −20° C., −40° C., −60° C., −80° C., −100° C., and −120° C., and a ductile-brittle transition temperature was determined based on changes in absorbed energy.

The results of the above described tests are put together in Table 16.

No Mn oxide having the maximum length exceeded 5 µm was observed. Also, no Mn—Si composite oxide having the longitudinal length exceeded 10 µm was observed. In addition, the maximum length of detected Mn oxides and the short-axial length of detected Mn—Si composite oxides were both 1 µm or more.

Change in the densities of Mn oxides and Mn—Si composite oxides can be explained by the elapsed time between the Si addition and the casting, which is the same as in other Examples previously described. In this Example, however, a case as attempted in which the concentration of Mn and the initial concentration of oxygen were made high and casting was carried out immediately after Si addition (10 seconds after). This resulted in steel sheets (8a-1 and 8a-2) in which the density of Mn oxides exceeded the upper limit of the range of the present invention. Another case was further attempted in which the casting was carried out 175 seconds and 200 seconds after Si addition. This resulted in a steel sheet (8a-5) in which the density of Mn—Si composite oxides exceeded the upper limit of the range of the present invention, and also resulted in a steel sheet (8a-6) in which the densities of both Mn oxides and Mn—Si composite oxides fell out of the range of the present invention.

For steel sheets 8a-3 and 8a-4, the densities of both Mn oxides and Mn—Si composite oxides fell within the range of the present invention. Consequently these steel sheets exhibited no delayed fracture, an excellent toughness with ductile-brittle transition temperatures of −67° C. to −65° C., a tensile strength of about 1600 MPa, and an elongation of about 9%, all of which were excellent.

In contrast, in the case (8a-6) in which the density of Mn oxides fell below the lower limit of the range of the present invention, the delayed fracture resistance was found inferior because crack generation was observed in any of the clearances.

In the cases (8a-1 and 8a-2) in which the density of Mn oxides exceeded the upper limit of the range of the present invention, and also in the cases (8a-5 and 8a-6) in which the density of Mn—Si composite oxides exceeded the upper limit of the range of the present invention, the ductility was found inferior to that of other HS samples within the range of the present invention.

In the case (8a-1) in which the density of Mn—Si composite oxides fell below the lower limit of the range of the present invention, the ductile-brittle transition temperature was higher than that in other cases and thus the toughness was found inferior. In the case of 8a-2, the density of Mn oxides exceeded the upper limit of the range of the present invention while the density of Mn—Si composite oxides was within the range of the present invention, which was considered to cause a slight deterioration in toughness.

The invention claimed is:
1. A high strength steel sheet comprising chemical components of, in mass %,
C: 0.20 to 0.42%,
Si: 0.06 to 0.5%,
Mn: 0.2 to 2.2%,
Cr: 0.1 to 2.5%,
B: 0.0005 to 0.01%,
O: 0.0020 to 0.020%,
Al: 0.001 to 0.03%,
Ti: 0.001 to 0.05%,
Nb: 0 to 0.1%,
Mo: 0 to 1.0%,
W: 0 to 0.5%,
V: 0 to 0.5%,
Ni: 0 to 5.0%,
Cu: 0 to 1.0%,
N: 0.1% or less,
P: 0.03% or less,
S: 0.02% or less, and
the balance: Fe and inevitable impurities,
wherein, in steel, $5 \times 10^3$ pieces per $mm^2$ or more to $1 \times 10^5$ pieces per $mm^2$ or less of Mn oxides having a maximum length of 1 μm or more to 5 μm or less are present, and
$1.7 \times 10^2$ pieces per $mm^2$ or more to $5 \times 10^3$ pieces per $mm^2$ or less of Mn—Si composite oxides having a short-axial length of 1 μm or more and a longitudinal length of 10 μm or less are present.

2. The high strength steel sheet according to claim 1, wherein the steel sheet is cold rolled by 35 to 70%.

TABLE 15

| Steel reference | Elapsed time between Si addition and casting (seconds) | C | Si | Mn | P | S | Cr | B | Ti | Al | N | O |
|---|---|---|---|---|---|---|---|---|---|---|---|---|
| 8a-1 | 10 | 0.26 | 0.17 | 2.2 | 0.02 | 0.004 | 0.2 | 0.0020 | 0.01 | 0.002 | 0.004 | 0.0180 |
| 8a-2 | 35 | 0.26 | 0.14 | 2.2 | 0.02 | 0.004 | 0.2 | 0.0020 | 0.01 | 0.002 | 0.004 | 0.0114 |
| 8a-3 | 85 | 0.26 | 0.12 | 2.2 | 0.02 | 0.004 | 0.2 | 0.0018 | 0.01 | 0.002 | 0.004 | 0.0065 |
| 8a-4 | 125 | 0.26 | 0.12 | 2.2 | 0.02 | 0.004 | 0.2 | 0.0020 | 0.01 | 0.002 | 0.004 | 0.0058 |
| 8a-5 | 175 | 0.26 | 0.12 | 2.2 | 0.02 | 0.004 | 0.2 | 0.0019 | 0.01 | 0.002 | 0.004 | 0.0059 |
| 8a-6 | 200 | 0.26 | 0.12 | 2.2 | 0.02 | 0.004 | 0.2 | 0.0022 | 0.01 | 0.002 | 0.004 | 0.0062 |

The unit of chemical components is % by mass.

TABLE 16

| No. | Steel | Density of Mn oxides (pieces/mm²) | Density of Mn—Si composite oxides (pieces/mm²) | Crack generation per clearance ○: Not observed X: Observed | | | | Ductile-brittle transition temperature (° C.) | Tensile strength (MPa) | Elongation (%) | |
|---|---|---|---|---|---|---|---|---|---|---|---|
| | | | | 3.9% | 12.5% | 21.4% | 28.6% | | | | |
| 1 | 8a-1 | $1.4 \times 10^5$ | 0 (not detected) | ○ | ○ | ○ | ○ | −22 | 1590 | 3.6 | Comparative example |
| 2 | 8a-2 | $1.1 \times 10^5$ | $1.7 \times 10^2$ | ○ | ○ | ○ | ○ | −41 | 1594 | 4.3 | Comparative example |
| 3 | 8a-3 | $6.6 \times 10^4$ | $4.1 \times 10^2$ | ○ | ○ | ○ | ○ | −67 | 1602 | 9.1 | Present invention |
| 4 | 8a-4 | $2.2 \times 10^4$ | $2.5 \times 10^3$ | ○ | ○ | ○ | ○ | −65 | 1598 | 8.8 | Present invention |
| 5 | 8a-5 | $5.1 \times 10^3$ | $5.1 \times 10^3$ | ○ | ○ | ○ | ○ | −60 | 1592 | 4.2 | Comparative example |
| 6 | 8a-6 | $4.9 \times 10^3$ | $5.3 \times 10^3$ | X | X | X | X | −61 | 1597 | 3.8 | Comparative example |

The underlined falls out of the range of the present invention.

3. A high strength member, wherein the high strength steel sheet according to claim 2 is heated to a temperature at which at least a portion of the steel sheet is transformed into an austenite phase, and is subsequently stamped with dies such that shaping and quenching are carried out in one process.

4. The high strength steel sheet according to claim 2, wherein the steel sheet is plated.

5. A high strength member, wherein the high strength steel sheet according to claim 4 is heated to a temperature at which at least a portion of the steel sheet is transformed into an austenite phase, and is subsequently stamped with dies such that shaping and quenching are carried out in one process.

6. The high strength steel sheet according to claim 4, wherein the steel sheet has an hot-dip-plated Al layer on the surface thereof, and an Fe—Al—Mn—Cr—B alloy layer having a thickness of 1 μm or more and 10 μm or less is present at an interface between the Al layer and the steel sheet.

7. A high strength member, wherein the high strength steel sheet according to claim 6 is heated to a temperature at which at least a portion of the steel sheet is transformed into an austenite phase, and is subsequently stamped with dies such that shaping and quenching are carried out in one process.

8. The high strength steel sheet according to claim 1, further comprising one or more selected from the group consisting of, in mass %,
Nb: 0.01 to 0.1%,
Mo: 0.01 to 1.0%,
W: 0.01 to 0.5%,
V: 0.01 to 0.5%,
Ni: 0.01 to 5.0%, and
Cu: 0.01 to 1.0%.

9. The high strength steel sheet according to claim 8, wherein the steel sheet is cold rolled by 35 to 70%.

* * * * *